United States Patent
Nemcansky et al.

[15] 3,635,309
[45] Jan. 18, 1972

[54] STEAM OR GAS DAMPER WITH AXIAL AND RADIAL BAFFLE PLATES

[72] Inventors: Jan Nemcansky; Stanislar Merta, both of Brno, Czechoslovakia

[73] Assignee: Prvni brnenska strojirna, oborovy podnik, Brno, Czechoslovakia

[22] Filed: Sept. 30, 1970

[21] Appl. No.: 76,805

[52] U.S. Cl. .................................................181/55, 181/69
[51] Int. Cl. .............................................................F01n 1/08
[58] Field of Search......................181/53, 55, 60, 37, 41, 49, 181/35, 56, 68–70

[56] References Cited

UNITED STATES PATENTS

| 452,230 | 5/1891 | Meady | 181/37 |
| 671,523 | 4/1901 | Lohbiller | 181/69 X |
| 3,491,850 | 1/1970 | Heitner | 181/53 X |

FOREIGN PATENTS OR APPLICATIONS

| 1,084,921 | 9/1967 | Great Britain | 181/60 |
| 278,547 | 10/1930 | Italy | 181/55 |

Primary Examiner—Robert S. Ward, Jr.
Attorney—Richard Low and Murray Schaffer

[57] ABSTRACT

A damper for steam or gas comprising an inlet, a first axial flow section, a second radial flow section and an outlet flow section. The axial flow section is formed of a conduit having a plurality of successively larger diameter perforated plates. The radial section is formed of a plurality of perforated coaxial cylinders. The housing surrounds the first and second sections and provides an annular tortuous passage to atmosphere.

6 Claims, 1 Drawing Figure

PATENTED JAN 18 1972
3,635,309
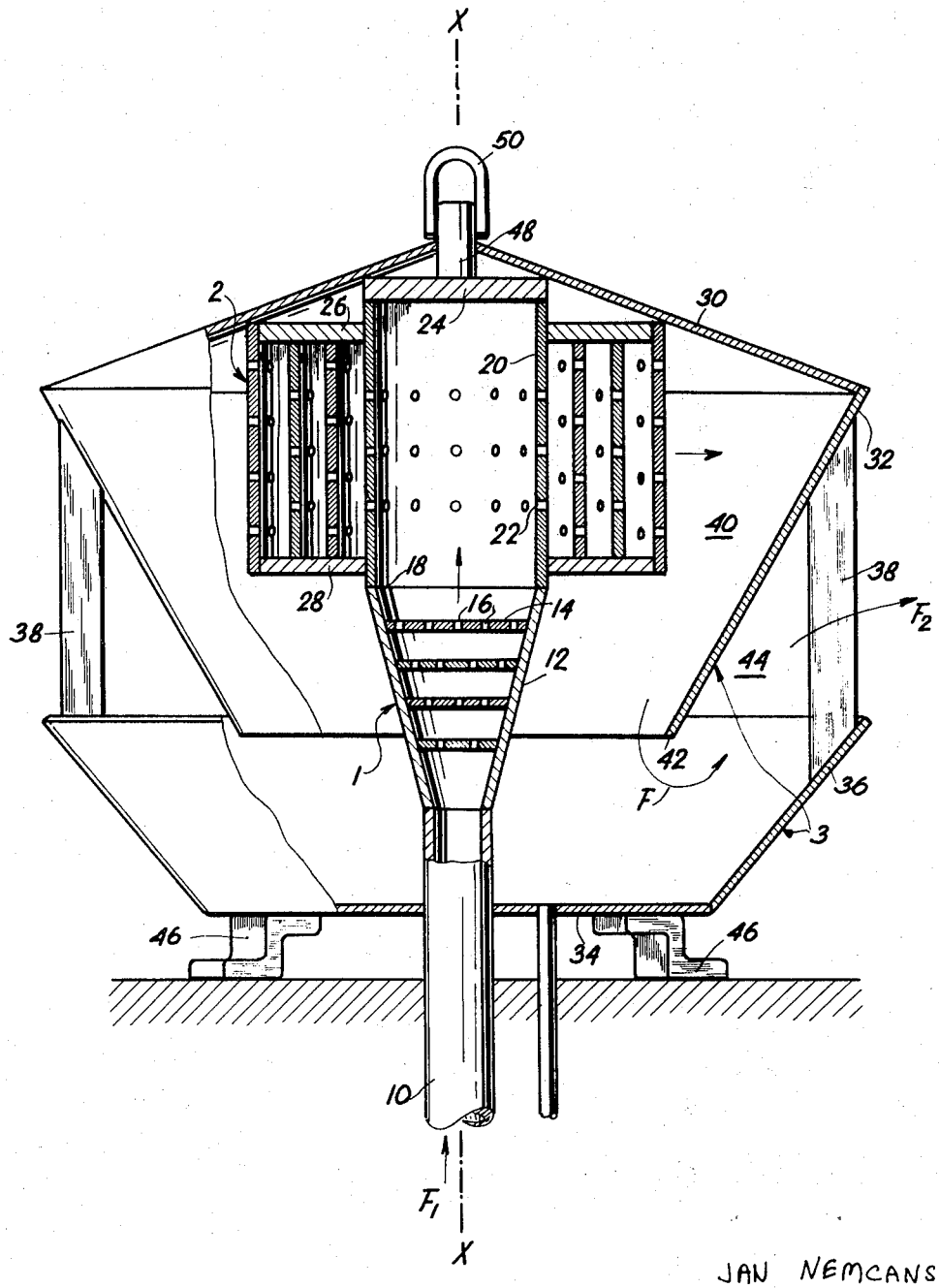
JAN NEMCANSKY
STANISLAV MERTA
INVENTORS
BY *Henry Schaff*
ATTORNEY

3,635,309

STEAM OR GAS DAMPER WITH AXIAL AND RADIAL BAFFLE PLATES

BACKGROUND OF INVENTION

The present invention relates to dampers, mufflers, and pressure-reducing devices for steam-generating systems.

The blowing of steam or high-pressure gas to atmosphere creates an excess amount of noise and is a most troublesome problem at generating stations. The noise created by the flow of steam at critical velocity sometimes exceeds the limit of pain and has a harmful effect upon both the personnel at the station and the inhabitants of the adjacent areas.

Conventional dampers or mufflers for reduction and safety valves are merely formed by a plurality of axially spaced baffle plates through which the kinetic energy of the steam is gradually reduced. Because of the space required for the steam to expand, the conventional devices are generally long and have a considerable height.

Low-pressure devices are also known. These, for the most part, comprise an absorptive type of porous filling such as steel wool, glass fibers or ceramic pellets. Efficiency of these devices is limited since the porous filling fouls, rusts, and clogs after only a relatively short time. Expansion valves or mufflers and multistage dampers and other techniques have also been used, but each has been unsuccessful in providing a simple, efficient, inexpensive, and truly noise-eliminating device.

It is the object of the present invention to provide a steam damper overcoming the drawbacks of the prior art.

It is further the object of the present invention to provide a steam or gas damper, muffler, reducing device, which is simple and inexpensive to construct and which is highly efficient.

It is a specific object of the present invention to provide a steam or gas muffler valve, reducing valve, or damper which eliminates the noise on the release of steam or gas to atmosphere.

These objects as well as numerous other objects and advantages will be found in the present disclosure of the invention.

SUMMARY OF INVENTION

According to the present invention a steam or gas damper is provided comprising an inlet, an axial flow section, a radial flow section communicating therewith and a housing surrounding said axial and radial sections and forming a tortuous passage for the outlet of the gas.

The axial flow section is formed of a funnellike conduit in which a plurality of parallel spaced plates are arranged. Each of the plates are successively larger in diameter and have a successively larger number of holes or perforations therein. The radial section comprises a plurality of coaxial cylinders each spaced from each other and having holes or perforations therein. The housing provides a first downward passage and a second upward passage for the outlet. The combination of spaced plates in the axial flow section, spaced cylinders in radial flow section and tortuous outlet provide a degree of expansion space sufficient to reduce the incoming steam or pressured gas to atmosphere.

Full details of the present invention as well as its construction will be seen from the following disclosure.

BRIEF DESCRIPTION OF DRAWING

In the disclosure, reference is made to the accompanying drawing in which the sole FIGURE is a vertical sectional view of the present damper.

As seen in the FIGURE the present damper comprises a first axial inlet flow section 1, a radial intermediate flow section 2 and an angular tortuous outlet flow section 3, all annularly symmetrical about a central axis $x-x$. The damper is arranged to permit flow of gas along the path shown by the arrows F.

The inlet section 1 comprises a cylindrical connecting pipe 10 adapted to be removably secured to the escape valve of the steam or gas-producing system (not shown). Communicating with connecting pipe 10 is an inverted conical or funnel conduit 12 in which a plurality of axially spaced circular baffle plates 14 are fixed. Each of the plates 14 has a plurality of holes or perforations 16 for the passage of steam or gas. The plates 14 are successively larger in diameter as they are spaced along the path of gas flow, each having a successively larger number of holes 16, and are firmly or integrally secured to the inner wall of the funnel.

Mounted above the funnel and sealed therewith is the radial flow section 2 which comprises a plurality of baffle cylinders 20 concentric to the axis $x-x$. The cylinders 20 are of successively larger diameter, spaced from each other and provided with a plurality of holes 22 for the radial passage of gas or steam. The inner one of the cylinders 20 is mounted in a sealed fashion axially on the upper end 18 the funnel conduit 12 so as to form a cylindrical continuation of the axial section 1. The upper end of the central one of the cylinders 22 is sealed by an integral cap 24 and the remaining ones of the cylinders 22 are sealed at their outer ends respectively by top and bottom sealing rings 26 and 28.

The outlet section 3 comprises an upper housing part formed of a conically flaring plate 30 having a radially inwardly directed skirt 32, and a lower housing part formed of a flat horizontally disposed plate 34 and an upward outwardly flaring rim 36. The conically flaring plate 30 has an angle adapting it to rest on or be secured as by welding to the edges of the cap 24 and/or the upper ring 26 and/or the cylinders 22 and a radius sufficient to space the depending 32 from the outer one of the cylinders 20. The depending skirt 32 terminates at a point axially within the limits of the funnel 12 and spaced from the lower plate 34. The lower plate 34 is secured at its center to the inlet pipe 10 and extends outwardly a diameter sufficient to permit the upwardly flaring rim 36 to be spaced from the depending skirt 32. One or more support braces 38 may be provided.

The outlet section therefor provides a downward passage 40 between the depending skirt 32 and the intermediate and inlet sections 2 and 1, and an upward passage 44 between the depending skirt 32 and upwardly flaring rim 36. Consequently gas entering the inlet pipe takes a tortuous path through the axial baffle, the radial baffle, the downward passage 40, about the terminus 42 of the skirt 32 and outwardly in an upward direction through the outlet formed by passage 44.

The outlet section is formed with a plurality of supporting feet 46. A central bolt 48 is secured at the upper end to the center of the cap 24 and the conical housing plate 30 to further integrally tie the parts together. The bolt 48 may be provided with a carrying or holding ring 50.

In operation, steam or gas leaving the valve of the system enters (arrow $F_1$) the inlet pipe 10, passes through the intermediate baffle 2, where it is gradually reduced to or near atmospheric pressure. The gas then flows downwardly through passage 40, bends about the edge 42 and subsequently upward through passage 44 outwardly (arrow $F_2$) of the housing. Because of the symmetrical annular design the flow of gas not only is throttled by the holes 16 and 22 in the baffle plates 14 and cylinders 20 but is extenuated, expanded, and diffused by the enlarging nature of the flaring funnel, cylinders, and passages 40 and 44. The present device is arranged so that during the flow of steam or gas the ratio of the pressure downstream of each of the baffle plates or cylinders is less than that upstream of the element. That is the flow is from higher to lower pressure past each successive element. In this manner, the steam or gas pressure, flow velocity and noise of the exhaust constantly lowers in the flow direction S.

During the passage of the steam or gas through the damper an isoenthalpic or uniform heat conversion process occurs. That is, during this passage, the heat content of the steam or gas per unit is uniformly reduced without the creation of a critical pressure ratio on any one baffle or unit of the device. Thus the creation of noise within the damper is prevented, obtaining a clear advantage over the prior devices wherein the possibility of a critical pressure and velocity ratio is not obviated.

The upwardly directed outlet passage 44 further provides for the final exhaustion of the gas against gravitational forces, further and lastly, reducing any pressure forces and fully completing expansion in the atmosphere.

The various parts are made of suitable materials, such as steel, brass, copper or other metals suitable for use with steam or other corrosive gases. Other material may be used for other gases and the choice of course will be determined by those skilled in this art to accomplish the intended purpose. It is preferred that the baffle plates 14 and the baffle cylinders 20 be uniformly spaced, from each other, however, this arrangement is not critical and there may be a number of applications where the spacing may be nonuniform.

The number of holes in each of the plates and cylinders is also not critical, although as it will be noted that because of the increasing diameter of each plate 14 or cylinder 20 the number of holes 16 and 22 respectively increases. By selecting the number of plates, cylinders, holes, and spacings, the pressure of the flowing gas across the various baffles can be made to drop or throttle at a predetermined rate or to a predetermined atmosphere. It is preferred that the various arrangements be chosen so that the pressure drop is uniform throughout the damper so that an isoenthalpic system results in the interior of the damper and variations in the system be avoided.

The construction of the present damper is simple and requires only a few parts which can be easily fabricated and assembled. The present device is trouble free employing no moving parts and may be readily cleaned if it should become contaminated with impurities. The damper may be used, without the need for special adaption on a variety of gas or steam systems as for example on turbine starting valves, impulse safety valves, noise dampeners, reducing valves, etc.

It will thus be seen that the present invention obtains the advantages and objects set for it, as well as numerous others. Since the present invention even takes a number of forms and can be modified in a variety of ways, the present disclosure is intended to be illustrative only.

What is claimed:

1. A steam or gas damper comprising an inlet, an axial flow section comprising a series of parallel perforated plates, a radial flow section comprising a plurality of coaxial perforated cylinders, an outlet section having a tortuous passage formed by a housing coaxially surrounding said axial and radial sections.

2. The damper according to claim 1 wherein said axial flow section comprises a funnel member in which said parallel plates are successively of larger diameter, each successive plate having an increased number of holes.

3. The damper according to claim 2 wherein said plates and said cylinders are respectively uniformly spaced from each other.

4. The damper according to claim 3 wherein said radial flow section is mounted at the end of said axial flow section coaxial with the axis thereof.

5. The damper according to claim 4 wherein said housing is formed by a pair of coaxial members each having a conical side, said conical sides being opposed to and spaced from each other to form the outlet of said damper.

6. The damper according to claim 5 wherein said housing defines an upwardly flowing outlet passage.

* * * * *